(12) United States Patent
Moorlag et al.

(10) Patent No.: US 8,957,138 B2
(45) Date of Patent: Feb. 17, 2015

(54) COMPOSITION OF MATTER

(75) Inventors: Carolyn P. Moorlag, Mississauga (CA); Yu Qi, Oakville (CA); Brynn M. Dooley, Toronto (CA); Qi Zhang, Milton (CA)

(73) Assignee: Xerox Corporation, Norwalk, CT (US)

( * ) Notice: Subject to any disclaimer, the term of this patent is extended or adjusted under 35 U.S.C. 154(b) by 271 days.

(21) Appl. No.: 13/446,227

(22) Filed: Apr. 13, 2012

(65) Prior Publication Data
US 2013/0273255 A1 Oct. 17, 2013

(51) Int. Cl.
*C08L 1/00* (2006.01)
(52) U.S. Cl.
USPC ............................................. 524/35; 524/544
(58) Field of Classification Search
USPC ................................................ 524/35, 544
See application file for complete search history.

(56) References Cited

U.S. PATENT DOCUMENTS

| | | | |
|---|---|---|---|
| 5,230,937 A * | 7/1993 | Effenberger et al. | 428/113 |
| 6,248,813 B1 | 6/2001 | Zehner | |
| 6,521,332 B2 * | 2/2003 | Ciaschi et al. | 428/304.4 |
| 7,252,873 B2 | 8/2007 | Ferrar et al. | |
| 2006/0165974 A1 | 7/2006 | Ferrar et al. | |
| 2010/0002282 A1 * | 1/2010 | Agrawal et al. | 359/275 |
| 2010/0230629 A1 * | 9/2010 | Yu et al. | 252/62.9 R |
| 2011/0159276 A1 | 6/2011 | Chen et al. | |
| 2012/0077000 A1 * | 3/2012 | Putnam et al. | 428/207 |
| 2012/0177719 A1 * | 7/2012 | Dao et al. | 424/444 |
| 2012/0282003 A1 | 11/2012 | Halfyard et al. | |
| 2013/0272763 A1 * | 10/2013 | Moorlag et al. | 399/333 |
| 2013/0274383 A1 * | 10/2013 | Moorlag et al. | 524/35 |
| 2013/0274384 A1 * | 10/2013 | Dooley et al. | 524/35 |

FOREIGN PATENT DOCUMENTS

| | | | |
|---|---|---|---|
| EP | 0614773 A1 | 3/1993 | |
| EP | 614773 A1 * | 9/1994 | |

OTHER PUBLICATIONS

Habibi, et al., Cellulose Nanocrystals: Chemistry, Self-Assembly, and Applications, Chem. Rev. 2010, 110, 3479-3500.*
U.S. Appl. No. 13/446,224, Office Action dated Sep. 25, 2014.

* cited by examiner

*Primary Examiner* — Peter D. Mulcahy
*Assistant Examiner* — Henry Hu
(74) *Attorney, Agent, or Firm* — Hoffman Warnick LLC

(57) ABSTRACT

The present teachings disclose a composite. The composite includes a cellulose material dispersed in a fluoropolymer. The cellulose material is present in an amount of from about 1 weight percent to about to about 30 weight percent of the composition. A method of manufacturing a composite article and coating is described.

7 Claims, No Drawings

COMPOSITION OF MATTER

CROSS REFERENCE TO RELATED APPLICATIONS

This application relates to commonly assigned copending application Ser. No. 13/446,224 filed simultaneously herewith and incorporated by reference in its entirety herein.

BACKGROUND

1. Field of Use

This disclosure is generally directed to cellulose composites which can be incorporated into fluoropolymers and used as coatings for a variety of applications requiring a robust, non-stick release coatings for windows, architectural panels, eyeglasses, cookware, and mechanical and electrical components, including O-rings, electrical device components, and xerographic and phase change ink jet components.

2. Background

The application relates generally to fluoropolymer cellulose reinforced composites wherein the cellulose may be in the form of fibers, flakes, whiskers, fibrils, and/or other amorphous or crystalline forms.

There is need for composites that are high in strength, low in weight and easy to manufacture. There is a need for composites that are biodegradable and manufactured from renewable resources. Such materials find uses in a variety of industries. There is a need for composite materials which can be easily processed.

Fluoropolymers have utility in a variety of applications due to superior chemical and thermal stability, as well as a low coefficient of friction. Mechanical properties of fluoropolymers tend to be acceptable in certain applications; however, improvements in strength and processing of fluoropolymer materials is desirable.

SUMMARY

According to an embodiment, there is described a composite article comprising a cellulose material present in an amount of from about 1 weight percent to about 30 weight percent; and a fluoropolymer present in an amount of from about 99 weight percent to about 70 weight percent.

According to another embodiment, there is described a method of making a composite article. The method includes providing a mixture of cellulose material present in an amount of from about 1 weight percent to about 30 weight percent and a fluoropolymer present in an amount of from about 99 weight percent to about 70 weight percent. The method includes extruding the mixture into a shape and heating the shaped mixture to a temperature of from about 170° C. to about 360° C. to form the article.

According to another embodiment there is provided a method of making a composite coating. The method includes providing a mixture of cellulose material present in an amount of from about 1 weight percent to about 30 weight percent and a fluoropolymer present in an amount of from about 99 weight percent to about 70 weight percent in a solvent. The method includes coating the mixture on a substrate and heating the mixture to a temperature of from about 170° C. to about 360° C. to form the coating.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more implementations, alterations and/or modifications can be made to the illustrated examples without departing from the spirit and scope of the appended claims. In addition, while a particular feature may have been disclosed with respect to only one of several implementations, such features may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. $-1$, $-2$, $-3$, $-10$, $-20$, $-30$, etc.

Described herein is a composite of a fluoropolymer and cellulose. The composite exhibits improved mechanical strength. In the present disclosure the dispersing of cellulose fibers or particles into a fluoropolymer is described. The resulting composite exhibits enhanced mechanical properties owing to the mechanical strength of cellulose materials. The composite maintains chemical and thermal stability. The fluoropolymer provides high surface energy which results in low friction surfaces. The resulting material is desirable for a range of applications, including but not limited to automotive and other manufactured parts, durable non-stick coatings, O-rings and electrical components and xerographic and phase change ink jet components.

Cellulose is an abundant material, derived from plants and containing a natural polymer, that imparts high strength and toughness to composite materials. It may be in the form of fibers, flakes, whiskers, fibrils, and or other amorphous or crystalline forms. Advantages that are obtained by incorporating high strength cellulose in a fluoropolymer are improvements in tensile strength, stiffness, and toughness. The incorporation of cellulose into a fluoropolymer enables sourcing renewable, widely available biodegradable materials requiring low energy consumption.

Cellulosic fibers and particles are of interest for the preparation of biocomposite materials for various applications due to the availability and renewability of pulp fibers (wood, or other) that are used as sources of cellulosic reinforcing materials. Some general applications for cellulose particles are as emulsifiers, bulking agents, or texturizers, and specifically in vitamin tablets and pill capsules. In biological applications, amorphous cellulose particles are useful to yield materials of high strength and flexibility that are non-toxic and biodegradable. Cellulose may be used in the form of fibers, flakes, whiskers, fibrils, and or other amorphous or crystalline forms.

Cellulose basic chemical composition is comprised of $C_6H_{10}O_5$ D-glucose units, linked together by β (C1→C4) linkage shown below.

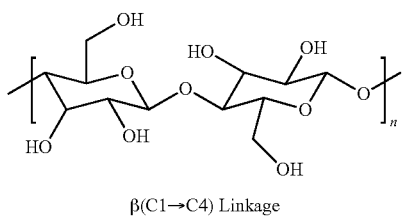

β(C1→C4) Linkage

Cellulose is composed of straight chains of from about 300 to about 10,000 linked D-glucose units. Naturally derived cellulose, referred to as cellulose I, or alternatively processed forms of cellulose, such as those referred to as cellulose II, cellulose III, and cellulose IV, where processed cellulose forms are derived from cellulose I may be used in the disclosure herein. Cellulose crystalline structure corresponds to arrangement of hydrogen bonds between and across β-cellulose strands, where cellulose I may comprise the crystalline arrangement $I_\alpha$ or $I_\beta$, or a mixture of $I_\alpha$ and $I_\beta$. Additionally, due to various processing procedures required to obtain cellulose in its various forms, cellulose chains may contain residual functional groups. One example of residual functional groups bonded to cellulose chains are esters such as acetate ester, propionate ester, nitrate ester, and sulfate ester. Another example of residual functional groups bonded to cellulose chains are ethers such as methyl ethers, ethyl ethers, ethyl hydroxide, and propyl hydroxide.

Cellulosic materials are derived from renewable, widely available sources and may be processed with little energy. In addition, cellulose particles are biodegradable. The surface groups of cellulose allow for chemical functionalization or addition of surfactants in order to tailor processing, wetting, or compatability with a polymer matrix. Examples of chemical functionalization of cellulose include functionalization with alkyl or benzyl amines, imines, halides, alkoxides, hydroxides, acid halides, or siloxyhalides. Examples of chemical surfactants used to modify surface properties of cellulose include ammonium salts such as alkyl or aryl quaternary ammonium halide salts; alkyl or aryl amines; phosphates, phosphate esters, sulfonates, carboxylates, or additional functional surfactants. Functionalization on cellulose strands may be present in ratios of from about 1 percent to about 30 percent of glucose units, or from about 5 percent to about 20 percent of glucose units, or from about 10 percent to about 15 percent of glucose units.

Particle size of cellulose may vary from cellulose strands that may be 1000 microns long, to nanocrystalline cellulose strands that may be as short as 20 nm. The form and size of cellulose will greatly affect resulting properties. Cellulose particles of smaller size dimensions less than 1 micron would generally require a lower ratio weight incorporation to achieve desired modification of mechanical properties. The type and number of processing steps required for dispersion and particle stabilization of cellulose particles is dependent on size dimension and type of cellulose particles.

The cellulose may be in crystalline or amorphous form. The size of the particles used may be within three separate size ranges from about 20 nm to about 3000 nm, or from about 35 nm to about 1000 nm, or from about 50-700 nm; or in the size range of from about 5 microns to about 500 microns, or from about 10 micron to about 100 microns, or from about 20 microns to about 50 microns; or in the size range of from about 500 microns to about 5000 microns, or from about 700 microns to about 4000 microns, or from about 1000 to about 3000 microns. The cellulose particles may be in the form of strands containing a length to width ratio of 10 or greater. The amount of cellulose particles dispersed in the fluoropolymer is from about 1 weight percent to about 30 weight percent, or from about 1 weight percent to about 10 weight percent or from about 1 weight percent to about 5 weight percent.

Advantages that are obtained by dispersing high strength cellulose particles or fibers into fluoropolymer composites include improvements in tensile strength, stiffness, and toughness. The incorporation of cellulose into fluoropolymer composites enables sourcing reinforcing materials that are renewable, widely available biodegradable materials requiring low energy consumption. Cellulose is also a desirable filler material due to its low cost.

Fluoropolymers suitable for use in the formulation described herein include fluorine-containing polymers. These polymers include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. The fluoropolymers provide chemical and thermal stability and have a low surface energy. The amount of fluoropolymer in the composite is from about 99 weight percent to about 70 weight percent, or from about 99 weight percent to about 90 weight percent or from about 99 weight percent to about 95 weight percent. The fluoropolymers have a curing or melting temperature of from about 170° C. to about 360° C. or from about 240° C. to about 330° C. These particles are heated to form the composite.

In broadest terms, the composite material includes at least one cellulosic material present in an amount in the range of from about 1 weight percent to about 30 weight percent, and a fluoropolymer material present in an amount in the range of from about 99 weight percent to about 70 weight percent.

The cellulosic material(s) may be selected from wood pulp, cotton, seed husks, ground rice hulls, newspaper, kenaf, coconut shells, bagasse, corn cobs, peanut shells, and mixtures thereof.

Prior to preparation of the composite, deagglomeration and dispersion of cellulose particles in solvent may be carried out by milling in milling media. Milling media used may be stainless steel, ceramic, polymeric or other spherical media about 0.1 mm to 5 mm in size. Solvents used for dispersion may include ketones, alcohols, acetonitrile, toluene, or other solvents. Cellulose particles are loaded into solvent in a percentage content of between about 5 weight percent to about 30 weight percent, or from about 10 weight percent to about 20 weight percent, or from about 12 weight percent to about 15 weight percent. Following deagglomeration and dispersion, cellulose particles are combined with fluoropolymer solution or dispersion, where the fluoropolymer is loaded into solvent in a percentage content of from about 10 weight percent to about 40 weight percent, or from about 15 weight percent to about 30 weight percent, or from about 20 weight percent to about 25 weight percent. Following mixing, cellulose/fluoropolymer dispersion are used to prepare the composite coating or article.

The composite may be an extruded article produced by extruding a composite disclosed herein.

A method of extruding a cellulosic composite is described herein, the method comprising the steps of: (1) loading the fluoropolymer and cellulose particles into an extruder; (2) extruding the composite as described above: and (3) heating the composite to cure for sufficient time at sufficient temperature to form a solid extrudate. In other embodiment, the extruded composite is used to form a solution or a dispersion in a solvent system. Following coating or casting of the solution or dispersion, the dried composition is heated to cure for sufficient time at sufficient temperature to form a melted or cured article.

Optionally, thermosetting materials can be added to improve properties such as moisture absorption and strength of the fluoropolymer and cellulose composite. Among the thermosetting materials which can be used are amines, siloxanes, aminosiloxanes, isocyanates, and phenolic and epoxy resins, and mixtures thereof.

Common commercial lubricants, both internal and external, known in the plastics processing industry can be used. Examples of lubricants which can be used include calcium stearate, esters, paraffin wax, and amide wax.

Additional components, for example foaming agents, surfactants and compatibilizers, can be added to the fluoropolymer and cellulose composite, if desired.

The mixture can be processed in a conical twin screw counterrotating extruder with a vent. A force feed hopper (or "crammer") is preferred to feed the materials into the extruder, although other types of hoppers could be used.

The composite of fluoropolymer and cellulose can be coated to form a layer or surface coating. A solution or dispersion of cellulose particles and fluoropolymer particles is prepared in any suitable known manner. The liquid or solvent used as the media for the solution can include water, an alcohol, a $C_5$-$C_{18}$ aliphatic hydrocarbon such as pentane, hexane, heptane, nonane, dodecane and the like, a $C_6$-$C_{18}$ aromatic hydrocarbon such as toluene, o-xylene, m-xylene, p-xylene, and the like, an ether, an ester, a ketone, and an amide. The liquid provides a media for dispersion of fluoropolymer particles and the cellulose particles. Typical techniques for forming articles from the composite material of fluoropolymer and cellulose particles include coating such as flow coating, liquid spray coating, dip coating, wire wound rod coating, bar coating, fluidized bed coating, powder coating, spray coating electrostatic spraying, sonic spraying, blade coating, molding, laminating, and the like. After the solution is coated the coating is heated to cure the coating and melt the fluoropolymer particles.

The cellulose particle-reinforced fluoropolymer composite materials can have a tensile strength ranging from about 500 psi to about 5000 psi, or from about 1200 psi to about 2200 psi, or from about 1400 psi to about 1800 psi; a toughness ranging from about 500 in-lbs/in$^3$ to about 5000 in-lbs/in$^3$, or from about 1500 in.-lbs/in$^3$ to about 4000 in-lbs/in$^3$, or from about 2400 in-lbs/in$^3$ to about 3000 in-lbs/in$^3$; and an initial modulus ranging from about 400 psi to about 3000 psi, or from about 500 psi to about 2000 psi, or from about 600 psi to about 1000 psi. In embodiments, the above-described mechanical properties can be measured using the ASTM D412 method as known in the art.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Example 1

Dispersion of Cellulose in a Fluoroelastomer

A fluoroelastomer composite was prepared as follows: methylcellulose was deagglomerated and dispersed in methylisobutyl ketone by milling with 2 mm stainless steel milling media to yield a stable, milky dispersion. Methylcellulose was loaded into methylsobutyl ketone with a percent incorporation of about 15 percent. The methylcellulose dispersion was combined with Viton GF (available from E. I. du Pont de Nemours, Inc.) and dissolved in ketone with a solids loading of about 20 weight percent). The subsequent dispersion is stable, and contains a total percent incorporation of modified cellulose in Viton of about 5 percent.

Example 2

Preparation of a Cellulose/Fluoroelastomer Top-Coat Layer

Cellulose/fluoropolymer dispersion described in Example 1 was coated onto a surface via an appropriate draw coating onto an aluminum substrate, to form a film upon drying of about 30 microns thick. The coating was subsequently cured by stepwise treatment to 177° C. over 16 hours.

Example 3

Preparation of a NCC/Fluoroelastomer Composite

A fluoroelastomer composite was prepared as follows: about 0.5 grams of approximately 150 nm nanocrystalline cellulose (NCC) whiskers and about 50 grams of Viton GF (available from E. I. du Pont de Nemours, Inc.) were mixed at about 170° C. using a twin screw extruder at a rotor speed of about 20 revolutions per minute (rpm) for about 20 minutes to form a polymer composite containing about 1 weight percent of NCC nanoparticles. A similar procedure was used to prepare two other fluoroelastomer composites with 3 weight percent and 10 weight percent of NCC nanoparticles respectively.

Example 4

Preparation of a NCC/Fluoroelastomer Top-Coat Layer

Three coating compositions containing the NCC composite from Example 3 were prepared, each containing about 17 weight percent fluoroelastomer composite dissolved in methyl isobutylketone (MIBK) and combined with 5 weight percent of VITON®-GF and AO700 crosslinker (aminoethyl aminopropyl trimethoxysilane crosslinker from Gelest) and 24 weight percent methanol. The coating compositions were coated onto three aluminum substrates with a barcoater and the coatings were cured via stepwise heat treatment over about 24 hours at temperatures between 49° C. and 177° C.

Example 5

Dispersion of NCC in a Fluoroplastic and a Coating Preparation

A coating formulation was prepared by dispersing MP320 powder PFA from DuPont (particle size greater than 15 microns) and approximately 150 nm nanocrystalline cellulose whiskers in 2-propanol with a total solids loading of 20 weight percent. The weight percents of NCC versus the total weights of NCC and PFA are 1, 3, and 10 percent. Dispersion of the components in 2-propanol is aided by repeated sonnication. Dispersions are then sprayed onto a silicone rubber substrate using a Paashe airbrush. The coatings are cured by heat treatment at 350° C. for 15-20 minutes to form a composite film.

While the invention has been illustrated respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

The advantages of reinforcing fluoropolymer with cellulose particles include high inherent strength of the composite material. The cellulose particles provide significant reinforcement compared with conventional fibers. Cellulosic materials are derived from renewable, widely available sources and may be processed via low energy consumption. The cellulosic materials are biodegradable. The surface groups of cellulose particles allow for chemical functionalization or addition of surfactants in order to tailor processing, wetting, or compatability with the fluoropolymer matrix.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:
1. A composite consisting of:
   a cellulose material consisting of: $C_6H_{10}O_5$ D-glucose units, linked together by β (C1→C4) linkage shown as:

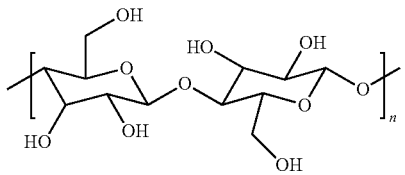

wherein n is from about 150 to about 5000, present in an amount of from about 1 weight percent to about 30 weight percent based on a solid weight of the composite;
   a fluoropolymer present in an amount of from about 99 weight percent to about 70 weight percent based on the solid weight of the composite, wherein the cellulose is dispersed throughout the fluoropolymer;
   an optional lubricant;
   an optional foaming agent;
   an optional surfactant; and
   an optional compatabilizer.
2. The composite of claim 1 wherein the cellulose material is in the form of fibers, flakes, whiskers or fibrils.
3. The composite of claim 1 wherein the cellulose material is in crystalline form.
4. The composite of claim 1 wherein the cellulose material is in amorphous form.
5. The composite of claim 1, wherein the fluoropolymer is selected from the group consisting of polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), hexafluoropropylene (HFP) and a cure site monomer.
6. The composite of claim 1 wherein the composite comprises an O-ring.
7. The composite of claim 1 wherein the composite comprises a non-stick coating.

* * * * *